(12) United States Patent
Simonson et al.

(10) Patent No.: US 9,977,597 B2
(45) Date of Patent: May 22, 2018

(54) ENHANCED READ RECOVERY BASED ON WRITE TIME INFORMATION

(71) Applicant: SEAGATE TECHNOLOGY LLC, Cupertino, CA (US)

(72) Inventors: Dana L. Simonson, Owatonna, MN (US); Kristofer C. Conklin, Burnsville, MN (US); Ryan J. Goss, Prior Lake, MN (US); Robert W. Moss, Windsor, CO (US); Stacey Secatch, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 16 days.

(21) Appl. No.: 15/151,345

(22) Filed: May 10, 2016

(65) Prior Publication Data

US 2017/0329525 A1    Nov. 16, 2017

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............ *G06F 3/0605* (2013.01); *G06F 3/061* (2013.01); *G06F 3/064* (2013.01); *G06F 3/0619* (2013.01); *G06F 3/0644* (2013.01); *G06F 3/0659* (2013.01); *G06F 3/0679* (2013.01)

(58) Field of Classification Search
CPC ......... G06F 3/061; G06F 3/064; G06F 3/0679
USPC ....................................................... 711/103
See application file for complete search history.

(56) References Cited

U.S. PATENT DOCUMENTS

| | | | |
|---|---|---|---|
| 5,715,193 A | 2/1998 | Norman | |
| 6,684,288 B1 | 1/2004 | Jacobs | |
| 2008/0098157 A1* | 4/2008 | Andrewartha | G06F 12/0804 711/103 |
| 2008/0294813 A1 | 11/2008 | Gorobets | |
| 2010/0191897 A1* | 7/2010 | Zhang | G06F 12/0246 711/103 |
| 2011/0041036 A1* | 2/2011 | Ootsuka | G06F 11/1048 714/758 |
| 2015/0262694 A1* | 9/2015 | Seo | G06F 11/1068 714/764 |

* cited by examiner

Primary Examiner — Edward Dudek, Jr.
Assistant Examiner — Sidney Li
(74) Attorney, Agent, or Firm — Holland & Hart LLP (57) ABSTRACT

Systems and methods for enhanced read recovery based on write time information are described. In one embodiment, the systems and methods include opening a block of flash memory cells for programming, tracking a block open time, and performing a read operation of a programmed page from the block based at least in part on the block open time. In some embodiments, the block includes a plurality of pages, each page including a plurality of flash memory cells. In some cases, the block open time includes an amount of time between the block opening for programming to a time the block closes for programming.

19 Claims, 6 Drawing Sheets

ENHANCED READ RECOVERY BASED ON WRITE TIME INFORMATION

SUMMARY

The present disclosure is directed to methods and systems for enhanced read recovery based on write time information. In some embodiments, the present systems and methods may perform a read operation on data from a single-level cell (SLC) page, multi-level cell (MLC) page, triple-level cell (TLC) page, etc.

A storage device for enhanced read recovery based on write time information is described. In one embodiment, the storage device may include a storage controller to open a block of flash memory cells for programming, identify a sequential order of the plurality of pages of the block from a first page to a last page, track a block open time, and perform a read operation of a programmed page from the block based at least in part on the block open time. In some cases, the block includes a plurality of pages, each page including a plurality of flash memory cells. In some embodiments, the block open time includes an amount of time between the block opening for programming to a time the block closes for programming. In some cases, opening the block may include making the flash memory cells of the block available for programming, and the block is programmed sequentially from the first page to the last page.

In some embodiments, the storage controller may be configured to program the first page of the block and track a time when the first page is programmed. In some embodiments, the storage controller may be configured to program a second page of the block after programming the first page, and upon programming the second page, determine a first delta time. In some cases, the first delta time may include an amount of time elapsed between programming the first page and programming the second page.

In some embodiments, the storage controller may be configured to store the first delta time in a header of the second page and program the last page of the block after programming a next to last page of the block. In some embodiments, after programming the last page, the storage controller may be configured to determine a next to last delta time, the next to last delta time comprising an amount of time elapsed between programming the next to last page and programming the last page.

In some embodiments, the storage controller may be configured to store the next to last delta time in a header of the last page. In some embodiments, after programming the last page, the storage controller may be configured to close the block. In some cases, closing the block makes the block unavailable for programming.

In some embodiments, after programming the last page, the storage controller may be configured to determine a time the block remained open based at least in part on the tracked block open time. In some embodiments, the storage controller may be configured to store the time the block remained open to the header of the last page of the block. In some embodiments, the storage controller may be configured to read the next to last delta time of the next to last page stored in the header of the last page and perform a read operation of the next to last page. In some cases, a setting of the read operation of the next to last page may be configured based at least in part on the next to last delta time read from the header of the last page.

In some embodiments, the storage controller may be configured to read the first delta time of the first page stored in the header of the second page and perform a read operation of the first page, a setting of the read operation of the first page being configured based at least in part on the first delta time read from the header of the second page.

An apparatus for enhanced read recovery based on write time information is also described. In one embodiment, the apparatus may include a processor, memory in electronic communication with the processor, and instructions stored in the memory, the instructions being executable by the processor to perform the steps of opening a block of flash memory cells for programming, tracking a block open time, and performing a read operation of a programmed page from the block based at least in part on the block open time. In some embodiments, the block includes a plurality of pages, each page including a plurality of flash memory cells. In some cases, the block open time includes an amount of time between the block opening for programming to a time the block closes for programming.

A method for enhanced read recovery based on write time information is also described. In one embodiment, the method may include opening a block of flash memory cells for programming, tracking a block open time, and performing a read operation of a programmed page from the block based at least in part on the block open time. In some embodiments, the block includes a plurality of pages, each page including a plurality of flash memory cells. In some cases, the block open time includes an amount of time between the block opening for programming to a time the block closes for programming.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The following relates generally to enhanced read recovery based on write time information. A single cell of a solid state drive (SSD) may store one, two, three, or four bits of data, etc. A cell occurs at each intersection of a bitline and a wordline. The column of cells in the page may be referred to as a string. A cell may be read by applying voltage at a wordline. A cell may be a 1-bit single level cell (SLC), 2-bit multi-level cell (MLC), 3-bit triple level cell (TLC), 4-bit quad level cell (QLC), etc. Cells may be arranged in silicon dies. In some embodiments, the dies may be organized into planes, the planes into blocks, and the blocks into pages, each page having multiple cells each. In some cases, a page is the smallest structure that is readable/writable in a SSD. As stated, pages are grouped together into blocks. A block may include, for example, 128 pages. In some cases, the smallest structure that can be erased in a flash-based SSD is a block. So while data may be read from and written to a page, data may be erased a block at a time.

In a write operation, data may be written one row of cells (e.g., a page) at a time. For example, via the word line of a row of SLCs, an SSD controller may locate an empty page ready to be programmed and alter the voltage for the given row to a high voltage level while grounding bit lines for each of the columns to be changed from a 1, the default state containing little or no charge, to a 0, causing electrons to migrate into the cells with grounded bit lines resulting in these cells becoming charged. Thus, for a SLC, a charged cell represents a binary 0, while a non-charged cell represents a binary 1. Higher bit-level cells may be charged with varying read reference voltage values to achieve higher bit densities per cell. For example, an MLC may be charged with one of four voltage levels in order to provide the binary values 00, 01, 10, or 11. As an example, when an MLC more or less absent of a charge is read, the MLC may be read as being programmed with the binary value 11. Likewise, if the MLC is within a range of a first voltage level (e.g., 1 volt) the MLC may be read as being programmed to 10, at a second voltage level (e.g., 2 volts) the MLC may be read as being programmed to 01, and at the highest voltage level (e.g., 3 volts) the MLC may be read as being programmed to 00, etc.

As a storage device writes information to its storage media, the storage device fills in pages in blocks on dies spread across multiple channels. However, in some cases, all pages in a block are filled before closing the block. As a result, the blocks may end up being held open for an extended period of time, which is complicated by the fact that the information previously written to open blocks degrades with the time that a block remains open. At some point, after filling its pages, a block may be closed and at a later point in time the device may come back and read data from this block. Because the pages were programmed at different times over a certain period of time and the degradation of the block is time based, the pages within the block may have a variety of ideal trim settings to minimize the errors on read. The claims and methods allow for improved read recovery by storing timestamp information in a header of a page at the time the page is programmed. When the storage device performs a read operation on the data written to this page, the storage device may read back the recorded header information and use it to optimize the read operation, thereby improving performance while reducing data degradation.

As explained above, data ages in flash memory and as the data ages errors may be induced (e.g., current leakage, charge loss over time, program interference from programming of neighboring cells, etc.). In past flash generations, read reference voltage values were fixed at design time. However, when the threshold voltage distributions are distorted (e.g., due to P/E cycling, charge loss over time, or program interference from the programming of neighboring cells), the distributions may shift and distribution tails may enter the previously non-overlapping distribution margin regions, crossing the fixed read reference voltage levels. As a result, a cell that stored one logical value may be misread as storing a different logical value (i.e., a read error). To combat such errors, read retry may be implemented. Read retry allows the read reference voltages to be dynamically adjusted to track changes in distributions. The read operation may be retried with the adjusted reference voltage levels such that read errors are decreased or eliminated. Thus, a page may be read based on a first read configuration. If this read fails, the system may select a second read configuration and attempt to read the page again based on the second read configuration. The more read iterations the longer the read operation takes. Iterating through the multiple read configurations is expensive time-wise and computation-wise. Accordingly, knowing the age of a page being read and applying the age-appropriate read configuration based on this timing information improves computation and efficiency of the storage system by avoiding the performance penalty of retrying a read operation.

Accordingly, storage media, such as flash, experiences a degradation of the data as a function of the time that a block is held open. Therefore, pages within the block written at different times may benefit from optimization of the recovery parameters. Open blocks may be mitigated by either closing the block or reading data from the block and moving the data to another block as the block nears a time limit where the degradation would cause significant errors rates. In some cases, the present systems and methods may include tracking how long a block remains open for programming before the block is closed. In some cases, upon opening a block or making a block available for programming, each page of the block may be in an un-programmed state. In some cases, the system may track the time between opening a block and programming a page. Additionally, or alternatively, the system may track the time between programming a page and closing the block. In some cases, the system may generate and track one or more timestamps in relation to opening a block, programming a page, and closing the block.

In one embodiment, a page may include at least one of a data header, block header, and epoch header, etc. Each header may include at least one of a header type field, a header value field, a host page address identifier field, a data length field, a code rate field, a program/erase count field, a band identification field, a timestamp field, and the like. In some cases, a header of a page may be used to save code rates, encryption salts for future recovery, etc. Headers written with user data and containing information suitable to restore a map of the SSD.

In one embodiment, a header of a page may be written to as the page is programmed. The data written to the header may include the duration that the block was open prior to the page being programmed. For example, a block with pages A and B, which may be among other pages, may be opened at time t0. Page A may be programmed at time t1. Thus, when page A is programmed, the system may write to a header of page A the duration since the block has been open until the time page A is programmed (t1-t0). When page B is programmed, the system may write to a header of page B the duration since the block was opened until the time page B is programmed (t2-t0), and so forth.

In one embodiment, the system may write to a page's header the time the block has remained open at the time of programming the page and a delta time since the last page in the block was written. For example, a block with pages A and B, among other pages, may be opened at time t0. Page A may be programmed at time t1. Page B may be programmed at time t2. Thus, when page A is programmed, the system may write to a header of page A the duration since the block has been open (t1-t0). When page B is programmed, the system may write to a header of page B the duration since the block was opened (t2-t0), and a delta time since page A was programmed (t2-t1). Writing this data to the headers has the advantage that blocks may be read in reverse order. Thus, page B may be read before reading page A. Accordingly, the optimal settings for reading page A may be determined by reading the contents of the header of page B while reading page B.

In one embodiment, the system may write to a page's header a delta time since the last page was programmed and write to the header of the last programmed page of the block the total time the block was open. For example, a block with pages A and B and last page Z, among other pages, may be opened at time t0. Page A may be programmed at time t1, Page B may be programmed at time t2, and Page Z may be programmed at time tN. Thus, when page A is programmed, the system may write to a header of page A the duration since the block has been open (t1-t0). When page B is programmed, the system may write to a header of page B a delta time since page A was programmed (t2-t1). When page Z is programmed, the system may write to a header of page Z the time the block was open (tN-t0) and close the block. In some cases, the system may also write to the header of page Z a delta time since page Z-1 was programmed (tN-tM), page Z-1 being programmed at time tM. Writing such a delta time to the header of each successive page and the total block open time to the header of the last programmed page has the advantage of enabling optimization of the read operation by reading the programmed pages in reverse (e.g., from page Z to page A, etc.) while minimizing the amount of data written to each page header.

As an example read operation, the system may first read the last page of the block, page Z. In some cases, the system may first determine the total time the block was held open for programming by reading information written to the header of page Z. Based on this information, the system may read the contents of page Z. After reading page Z, the system may read the second to last page, page Z-1 based on this information. For example, based on the delta time (tN-tM) written to the header of page Z, the system may read the contents of page Z-1, and so forth. Accordingly, reading a page of a block may be configured based on any combination of the time at which the block is opened for programming of pages, the time at which the block is closed for programming, the period of time the block remained open for programming from the time it opened to the time it closed, the time a page remained un-programmed to the time the page was programmed, the amount of time from programming a page of a block to closing the block, the time between programming a first page to programming a second page, and so forth.

Figure 1:
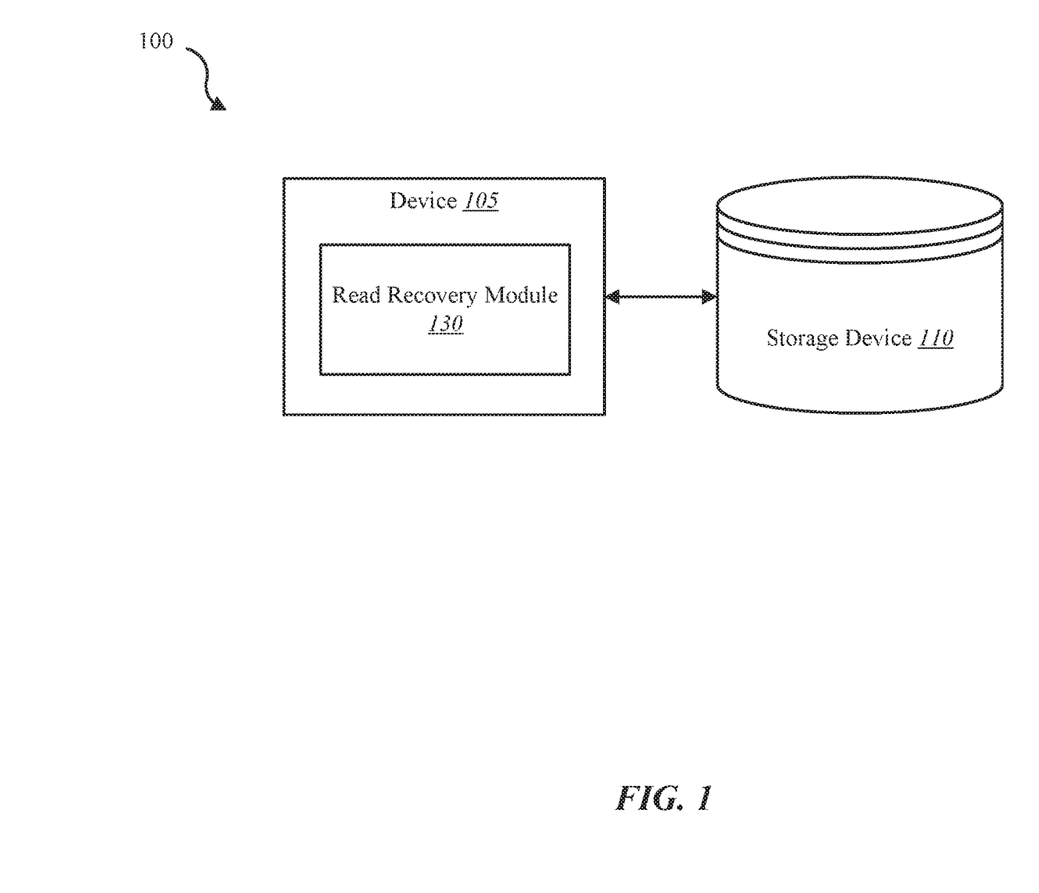
FIG. 1 is a block diagram of an example of a system in accordance with various embodiments.

FIG. 1 is a block diagram illustrating one embodiment of an environment 100 in which the present systems and methods may be implemented. The environment may include device 105 and storage device 110. The storage device 110 may include any combination of hard disk drives, solid state drives, and hybrid drives that include both hard disk and solid state drives. The storage device 110 may include a volatile cache (e.g., disk buffer, static random access memory (RAM), dynamic RAM, etc.). The volatile cache may hold data temporarily such as new data to be stored on the storage device 110 and/or data already stored at a first storage location of storage device 110 being transferred to a second storage location. In some cases, storage device 110 may include one or more non-volatile memory devices.

In some embodiments, the systems and methods described herein may be performed on a single device (e.g., device 105 and storage device 110 in a single enclosure). In some cases, the methods described herein may be performed on multiple storage devices or a network of storage devices. Examples of device 105 include a storage server, a storage enclosure, a storage controller, storage drives in a distributed storage system, storage drives on a cloud storage system, a storage device on personal computing devices, a storage device on a server, etc. In some configurations, device 105 may include a read recovery module 130. In one example, the device 105 may be coupled to storage device 110. In some embodiments, device 105 and storage device 110 may be components of an SSD drive. Alternatively, device 105 may be a component of a host (e.g., operating system, host hardware system, etc.) of the storage device 110.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, etc. In one example, device 105 may be operable to receive data streams, store and/or process data, and/or transmit data from, to, or in conjunction with one or more local and/or remote computing devices.

The device 105 may include a database. In some cases, the database may be internal to device 105. For example, storage device 110 may include a database. Additionally, or alternatively, the database may include a connection to a wired and/or a wireless database. Additionally, as described in further detail herein, software and/or firmware (e.g., stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), etc. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. Storage device 110 may include a hard disk drive (HDD) with an SMR region. In one embodiment, read recovery module 130 may store timing information in relation to programming one or more memory cells of storage device 110. To improve device performance when reading programmed memory cells of storage device 110, read recovery module 130 may configure a read operation based on the stored timing information generated at the time the memory cells were programmed.

Figure 2:
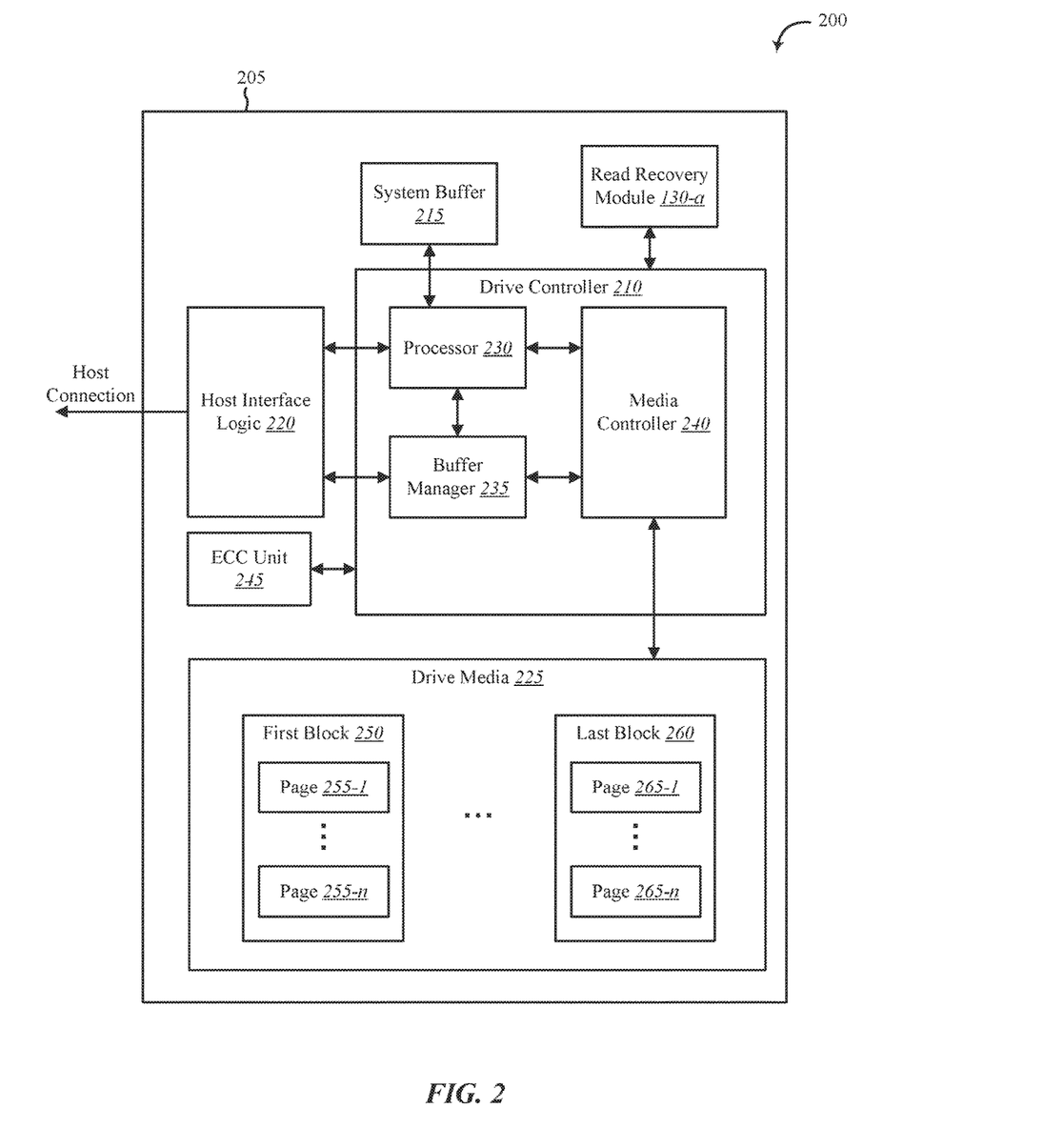
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, drive buffer 215, host interface logic 220, drive media 225, and read recovery module 130-*a*. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, a media controller 240, and an ECC unit 245. The drive controller 210 may process, via processor 230, read and write requests in conjunction with the host interface logic 220, the interface between the apparatus 205 and the host of apparatus 205 (e.g., an operating system, host hardware system, etc.). The drive buffer 215 may hold data temporarily for internal operations of apparatus 205. For example, a host may send data to apparatus 205 with a request to store the data on the drive media 225. The drive controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215. As depicted, drive media 225 may include one or more blocks of memory cells (e.g., first block 250 to last block 260). In some cases, the memory cells of each block may be divided into multiple pages of memory cells. For example, first block 250 may include a set of pages 255-1 to 255-*n*, and last block 260 may include a set of pages 265-1 to 265-*n*, each page including multiple memory cells.

Although depicted outside of drive controller 210, in some embodiments, read recovery module 130-*a* may include software, firmware, and/or hardware located within drive controller 210 and/or other components of apparatus 205. For example, read recovery module 130-*a* may include at least portions of drive buffer 215, host interface logic 220, processor 230, buffer manager 235, and/or media controller 240. In one example, read recovery module 130-*a* may include one or more instructions executed by processor 230, buffer manager 235, and/or media controller 240. The read recovery module 130-*a* may be configured to record timing information in relation to programming pages of memory cells such as pages 255-1 to 255-*n* of first block 250, etc. In some cases, read recovery module 130-*a* may access the recorded timing information when reading the pages of memory cells. In some cases, read recovery module 130-*a* may configure a read operation based on the recorded timing information.

Figure 3:
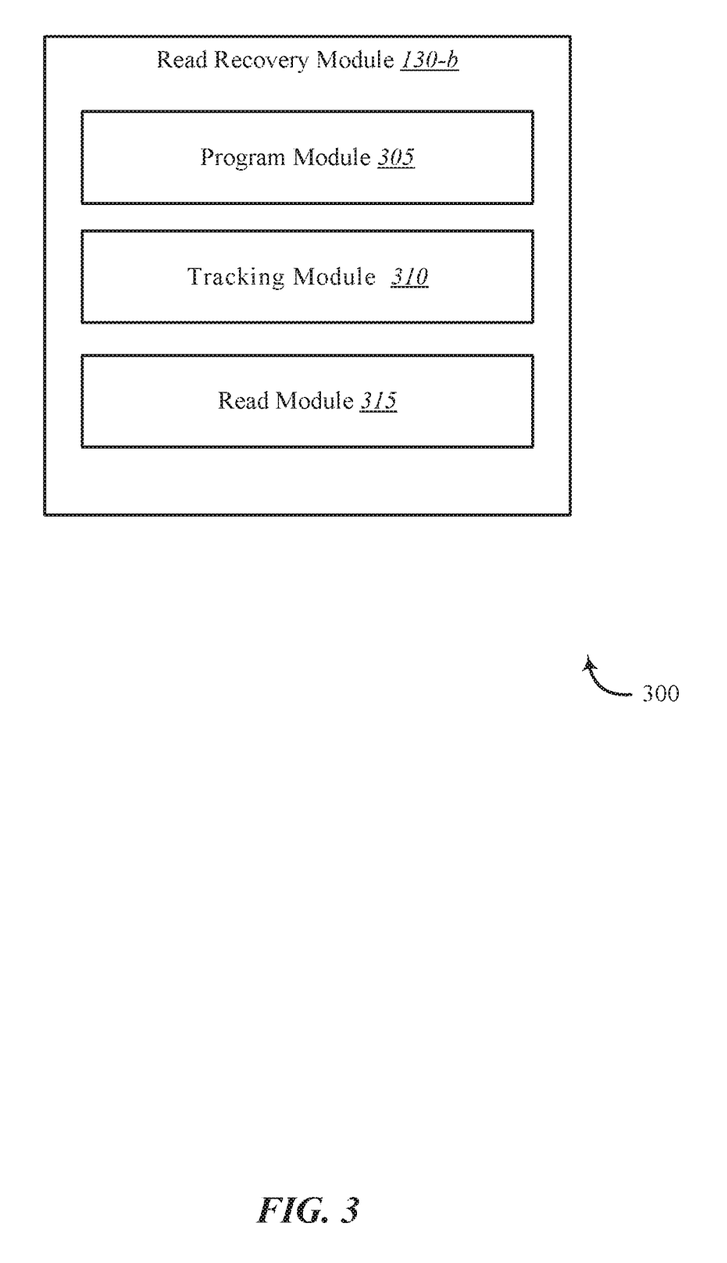
FIG. 3 shows a block diagram of one or more modules in accordance with various aspects of this disclosure.

FIG. 3 shows a block diagram 300 of a read recovery module 130-*b*. The read recovery module 130-*b* may include one or more processors, memory, and/or one or more storage devices. The read recovery module 130-*b* may include program module 305, tracking module 310, and read module 315. The read recovery module 130-*b* may be one example of read recovery module 130 of FIGS. 1 and/or 2. Each of the illustrated components may be in communication with each other.

In one embodiment, program module 305 may open a block of flash memory cells for programming. In some cases, the block may include a plurality of pages, and each page may include a plurality of flash memory cells. In some embodiments, program module 305 may identify a sequential order of the plurality of pages of the block from a first page to a last page. In some embodiments, tracking module 310 may track a block open time, the block open time may include an amount of time between the block opening for programming to a time the block closes for programming. In some cases, opening the block may include the program module 305 making the flash memory cells of the block available for programming. In some embodiments, program module 305 may program the pages of the block sequentially from the first page to the last page of the block.

In some embodiments, read module 315 may perform a read operation of a programmed page from the block based at least in part on the block open time. The block open time may include any combination of times between opening the block for programming to closing the block for programming. For example, read module 315 may perform a read operation based on any combination of the opening time at which the block is opened for programming of pages, the closing time at which the block is closed for programming, the total time the block remains open for programming from the time it opens to the time it closes, the amount of time a page remains un-programmed to the time the page is programmed, the amount of time from programming a page of a block to closing the block, the time between programming a first page to programming a second page, and so forth.

In some embodiments, tracking module 310 may generate a timestamp upon opening the block for programming, upon programming a page of the block, upon closing the block, etc. In some embodiments, tracking module 310 may store a generated timestamp in a header of at least one page of the block. As an example, tracking module 310 may generate a page timestamp indicating a time when a page is programmed and the program module 305 may store the page timestamp in a header of at least one page of the block.

In some embodiments, program module 305 may program the first page of the block at a certain time after opening the block for programming and/or relatively at the same time the block is open for programming. In some embodiments, tracking module 310 may track the time when the first page is programmed. In some embodiments, program module 305 may program a second page of the block after programming the first page. In some embodiments, upon programming the second page, tracking module 310 may determine a first delta time. As one example, the first delta time may include an amount of time elapsed between programming the first page and programming the second page. Thus, if the first page is programmed at time t1 and the second page is programmed at t2, the delta time may be calculated based on the difference between times t1 and t2 (e.g., t2-t1).

In some embodiments, program module 305 may store the first delta time in a header of a page of the block. For example, program module 305 may store the first delta time in the header of the first page and/or the second page. In some embodiments, program module 305 may program the last page of the block after programming a next to last page of the block. For example, program module 305 may program the next to last page at time tM and program the last page of the block at time tN. In some embodiments, after programming the last page, tracking module 310 may determine a next to last delta time. As an example, the next to last delta time may be based on an amount of time elapsed between programming the next to last page and programming the last page. For example, the next to last delta time may be calculated based on the difference between times tM and tN (e.g., tN-tM).

In some embodiments, program module 305 may store the next to last delta time in a header of a page of the block. For example, program module 305 may store the next to last delta time in the header of the next to last page programmed and/or the last page programmed in the block.

In some embodiments, after programming the last page, program module 305 may close the block. In some cases, closing the block may make the block unavailable for programming. In some embodiments, after programming the last page, tracking module 310 may determine a time the block remains open based at least in part on the tracked block open time. As an example, a block may open at time t0 and close at time tN. Thus, tracking the block open time may include tracking the open time t0 and close time tN among other times that may be tracked. The tracking module 310 may determine the time the block remains open based on a difference between the open and close times (e.g., tN-t0).

In some embodiments, program module 305 may store the time the block remained open to the header of one or more pages of the block. For example, program module 305 may store the time the block remained open to at least the last page programmed in the block. In one embodiment, read module 315 may read the next to last delta time of the next to last page stored in the header of the last page. In some embodiments, read module 315 may perform a read operation of the next to last page. As an example, read module 315 may configure a setting of the read operation of the next to last page based at least in part on the next to last delta time read from the header of the last page.

In one embodiment, read module 315 may read the first delta time of the first page stored in the header of the second page and perform a read operation of the first page based on the information read from the header of the second page. As one example, read module 315 may configure a setting of the read operation of the first page based at least in part on the first delta time read from the header of the second page. As one example, the read module 315 may adjust a trim setting for one or more pages of the block based on timing information stored the page headers. In some embodiments, a shift in a voltage threshold (Vt-shift) may be set based on the accessed timing information stored in the page headers.

In some embodiments, upon determining data on the page is encrypted, timing information such as the tracked block open time may be stored in metadata associated with one or more pages to avoid the timing information being encrypted. In some cases, the program module 305 may store the timing information in a single location. As an example, the program module 305 may store the timing information in a table stored in a non-volatile memory such as a non-volatile random-access memory (RAM) and/or other type of memory on the storage system and/or a host system. In some cases, the table may be compressed. In some cases, the table may be associated with a garbage collection unit (GCU). Accordingly, as a read is performed in relation to a GCU, the timing information for that GCU may be accessed from a single location.

Figure 4:
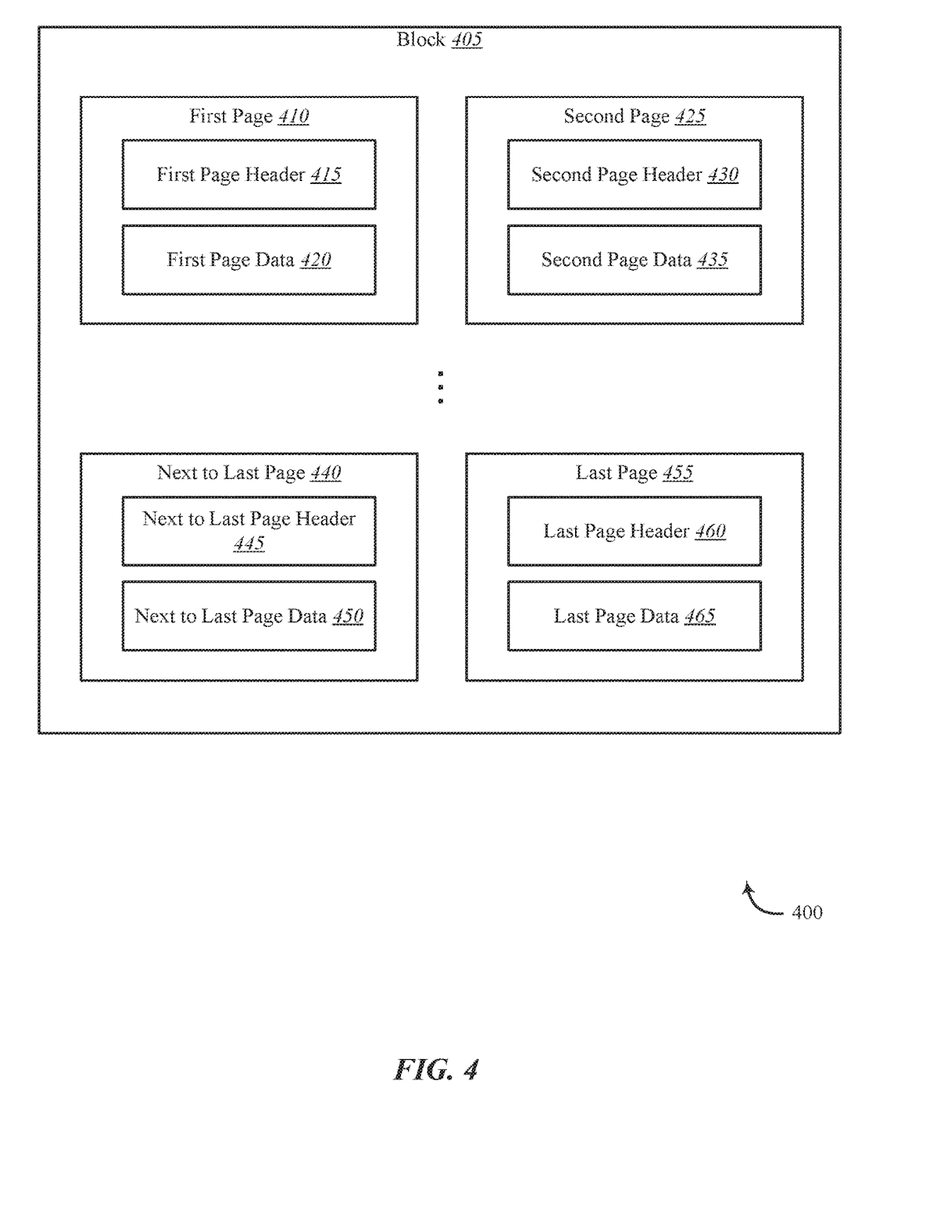
FIG. 4 shows a diagram of a system in accordance with various aspects of this disclosure.

FIG. 4 shows a system 400 for enhanced read recovery based on write time information, in accordance with various examples. System 400 may include a block 405, which may be an example of a block from drive media 225 of FIG. 2 (e.g., first block 250, last block 260, etc.).

As illustrated, block 405 may include a set of pages. As one example, the set of pages may include first page 410, second page 425, one or more intervening pages not depicted, next to last page 440, and last page 455. Each page may include multiple memory cells, such as SLC, MLC, TLC memory cells, etc. The memory cells of each page may store data based on voltages held by the memory cells. Thus, as depicted, first page 410 may include first page data 420, second page 425 may include second page data 435, next to last page 440 may include next to last page data 450, and last page 455 may include last page data 465. In some cases, each page may include one or more headers. For example, first page 410 may include first page header 415, second page 425 may include second page header 430, next to last page 440 may include next to last page header 445, and last page 455 may include last page header 460. In some cases, a header of a page may be included in a header to the data stored in the page. For example, although depicted as being separate, in some embodiments first page header 415 may be included in a header portion of first page data 420. Alternatively, in some embodiments, first page header 415 may be separate from first page data 420.

In some embodiments, a storage system may open block 405 for programming. For example, block 405 may be opened in conjunction with device 105, apparatus 205, and/or read recovery module 130 of FIGS. 1, 2, and/or 3. After making block 405 available for programming, a sequential order of the pages may be determined. For example, first page 410 may be first in the sequential order and last page 455 may be last in the sequential order. In some cases, the order in which the pages of block 405 are programmed may be based on the determined sequential order. Thus, first page 410 may be programmed first, followed by programming second page 425, programming one or more intervening pages, followed by programming next to last page 440, and finally programming last page 455.

In some embodiments, timing information related to the opening of block 405, programming of the pages of block 405, and closing of block 405 may be tracked and stored in a non-volatile memory or storage location. For example, upon opening block 405, an open block timestamp may be generated and stored for future reference. Upon programming first page 410 with data (e.g., first page data 420), a first page program timestamp may be generated. In some cases, the open block timestamp and/or first page program timestamp may be stored in one or more storage locations. As one example, the open block timestamp and/or first page program timestamp may be stored in a header of a page of block 405. Thus, upon generating open block timestamp this timing information may be stored in first page header 415. Likewise, upon generating first page program timestamp this timing information may be stored in first page header 415. Additionally, or alternatively, timing information such as described here may be stored in a central location such as a non-volatile memory on a storage device of block 405. In some cases, the timing information may be stored in a table. Upon performing a read operation, the table stored in the central location may be referenced to determine a configuration of a read operation of one or more pages of a block such as block 405.

In some embodiments, a second page program timestamp may be generated upon programming second page 425 with data (e.g., second page data 435). In some cases, a delta time since the first page 410 is programmed may be determined at the time the second page 425 is programmed. For example, the delta time may be calculated by determining the difference between the second page program timestamp and the first page program timestamp. In one embodiment, the delta time since the first page 410 is programmed may be stored in the second page header 430 of second page 425. Similarly, timestamps may be generated upon programming subsequent pages of block 405 such as next to last page 440 and last page 455. In one embodiment, a next to last delta time may be determined that indicates the time since the next to last page 440 is programmed in relation to the time the last page 455 is programmed. In some cases, the next to last delta time may be stored in the last page header 460 of the last page 455. In some embodiments, after programming last page 455, block 405 may be closed, making block 405 unavailable for programming. After closing block 405, a total block open time may be calculated. The total block open time may indicate the total time block 405 remained open for programming from the time of opening block 405 to the time of closing block 405. In some cases, the total block open time may be stored in last page header 460 of last page 455.

In some cases, a counter may be initiated upon opening block 405. As one example, the counter may count how much time (e.g., nanoseconds, milliseconds, seconds, etc.) lapses since block 405 is opened. The counter may be referenced upon programming a page such as first page 410. Thus, upon opening block 405, the counter may be set to time t0. The counter may be reference each time a page is programmed. For example, first page 410 may be programmed at time tX, the time tX may be stored in a non-volatile storage location such as first page header 415 and/or second page header 430. Likewise, second page 425 may be programmed at time tY. In some cases, the time tY may be stored in a non-volatile storage location such as in second page header 430. In some cases, a first delta time between tY and tX (e.g., tY−tX) may be calculated to determine a time since first page 410 is programmed at the time second page 425 is programmed. The first page delta time may be stored in second page header 430.

In some embodiments, upon closing block 405, a read operation may be performed on one or more pages of block 405. In some cases, the pages of block 405 may be read in an order opposite in which the pages were programmed. For example, first page 410 may be programmed first, second page 425 second, intervening pages next, followed by next to last page 440, and last page 455 may be programmed last.

When performing a read operation, however, last page 455 may be read first, followed by next to last page 440, any intervening pages, then second page 425, and finally first page 410.

In some embodiments, a read operation may read timing information stored in a currently-read page in order to determine how to configure a read operation of the next page to be read. For example, timing information in last page header 460 may be referenced to determine how to read next to last page 440. As explained above, the time period block 405 remains open and the time since programming next to last page 440 may be stored in last page header 460. Thus, a read operation of next to last page 440 may be based at least in part on reading, at the time of reading data from last page 455, the time period block 405 remains open and/or the time since programming next to last page 440 stored in last page header 460. Likewise, at the time data from second page 425 is being read, timing information in second page header 430 may be accessed. This accessed timing information may then be used to set up and configure a read operation of first page 410. Accordingly, a read operation may be configured specifically to a programmed page based on the associated timing information of that programmed page, resulting in less time being spent reading the data from the programmed pages.

Figure 5:
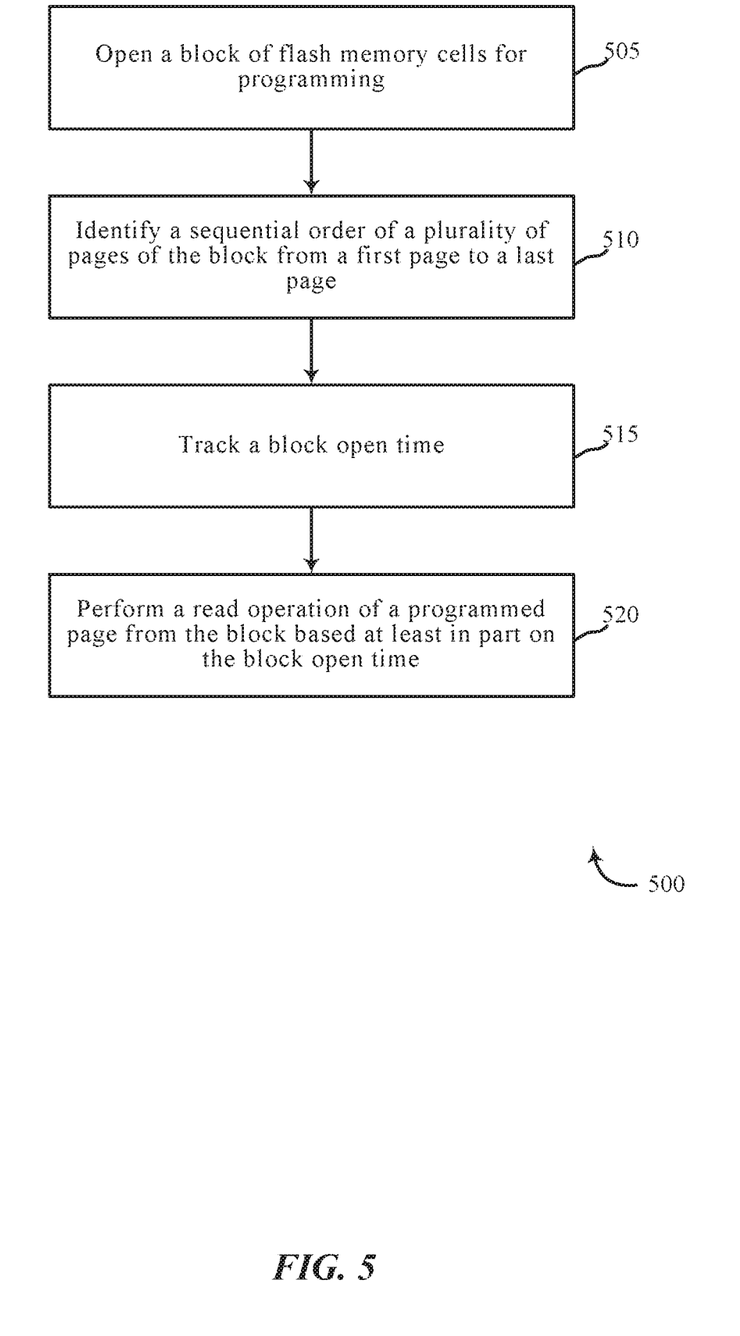
FIG. 5 is a flow chart illustrating an example of a method in accordance with various aspects of this disclosure.

FIG. 5 is a flow chart illustrating an example of a method 500 for enhanced read recovery based on write time information, in accordance with various aspects of the present disclosure. One or more aspects of the method 500 may be implemented in conjunction with device 105 of FIG. 1, apparatus 205 of FIG. 2, and/or read recovery module 130 depicted in FIGS. 1, 2, and/or 3. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 505, the method 500 may include opening a block of flash memory cells for programming. In some cases, the block may include a plurality of pages, each page including multiple flash memory cells. At block 510, the method 500 may include identifying a sequential order of the plurality of pages of the block from a first page to a last page. At block 515, the method 500 may include tracking a block open time. In some cases, the block open time may include an amount of time between the block opening for programming to a time the block closes for programming. At block 520, the method 500 may include performing a read operation of a programmed page from the block based at least in part on the block open time.

The operation(s) at block 505-520 may be performed using the read recovery module 130 described with reference to FIGS. 1-3 and/or another module. Thus, the method 500 may provide for enhanced read recovery based on write time information relating to enhanced read recovery based on write time information. It should be noted that the method 500 is just one implementation and that the operations of the method 500 may be rearranged, omitted, and/or otherwise modified such that other implementations are possible and contemplated.

Figure 6:
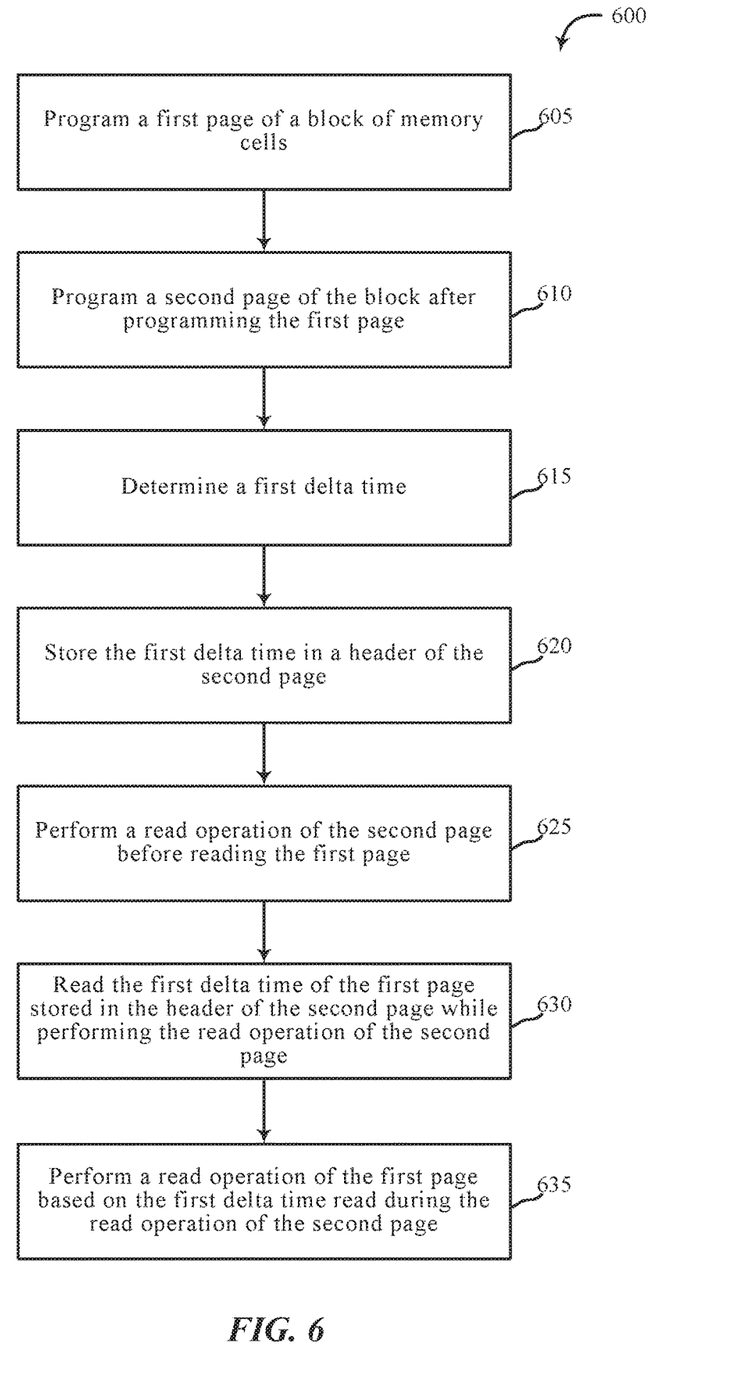
FIG. 6 is a flow chart illustrating an example of a method in accordance with various aspects of this disclosure.

FIG. 6 is a flow chart illustrating an example of a method 600 for enhanced read recovery based on write time information, in accordance with various aspects of the present disclosure. One or more aspects of the method 600 may be implemented in conjunction with device 105 of FIG. 1, apparatus 205 of FIG. 2, and/or read recovery module 130 depicted in FIGS. 1, 2, and/or 3. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include programing a first page of a block of memory cells. At block 610, the method 600 may include programing a second page of the block after programming the first page. At block 615, the method 600 may include determining a first delta time. In some cases, the first delta time may include an amount of time elapsed between programming the first page and programming the second page. At block 620, the method 600 may include storing the first delta time in a header of the second page. At block 625, the method 600 may include performing a read operation of the second page before reading the first page. At block 630, the method 600 may include reading the first delta time of the first page stored in the header of the second page. At block 635, the method 600 may include performing a read operation of the first page based on the first delta time read during the read operation of the second page.

The operations at blocks 605-635 may be performed using the read recovery module 130 described with reference to FIGS. 1-3 and/or another module. Thus, the method 600 may provide for enhanced read recovery based on write time information relating to enhanced read recovery based on write time information. It should be noted that the method 600 is just one implementation and that the operations of the method 600 may be rearranged, omitted, and/or otherwise modified such that other implementations are possible and contemplated.

In some examples, aspects from two or more of the methods 500 and 600 may be combined and/or separated. It should be noted that the methods 500 and 600 are just example implementations, and that the operations of the methods 500 and 600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising a storage controller to:
   open a block of flash memory cells for programming, the block comprising a plurality of pages, each page comprising a plurality of flash memory cells;
   identify a sequential order of the plurality of pages of the block from a first page to a last page;
   track a block open time, the block open time comprising an amount of time between the block opening for programming to a time the block closes for programming; and
   perform a read operation of a programmed page from the block based at least in part on the block open time, wherein performing the read operation comprises adjusting a voltage threshold based at least in part on the block open time.

2. The storage system of claim 1, the storage controller to:
   program the first page of the block; and
   track a time when the first page is programmed.

3. The storage system of claim 2, the storage controller to:
   program a second page of the block after programming the first page; and
   upon programming the second page, determine a first delta time, the first delta time comprising an amount of time elapsed between programming the first page and programming the second page.

4. The storage system of claim 3, the storage controller to:
   store the first delta time in a header of the second page.

5. The storage system of claim 4, the storage controller to:
   program the last page of the block after programming a next to last page of the block.

6. The storage system of claim 5, the storage controller to:
   after programming the last page, determine a next to last delta time, the next to last delta time comprising an amount of time elapsed between programming the next to last page and programming the last page.

7. The storage system of claim 6, the storage controller to:
   store the next to last delta time in a header of the last page.

8. The storage system of claim 5, the storage controller to:
   after programming the last page, close the block, closing the block making the block unavailable for programming.

9. The storage system of claim 5, the storage controller to:
   after programming the last page, determine a time the block remained open based at least in part on the tracked block open time.

10. The storage system of claim 9, the storage controller to:
    store the time the block remained open to the header of the last page of the block.

11. The storage system of claim 10, the storage controller to:
    read the next to last delta time of the next to last page stored in the header of the last page; and
    perform a read operation of the next to last page, a setting of the read operation of the next to last page being configured based at least in part on the next to last delta time read from the header of the last page.

12. The storage system of claim 8, the storage controller to:
    read the first delta time of the first page stored in the header of the second page; and
    perform a read operation of the first page, a setting of the read operation of the first page being configured based at least in part on the first delta time read from the header of the second page.

13. The storage system of claim 1, wherein opening the block comprises making the plurality of flash memory cells of the block available for programming, and the block is programmed sequentially from the first page to the last page.

14. A storage system comprising a storage controller to:
    open a block of flash memory cells for programming, the block comprising a plurality of pages, each page comprising a plurality of flash memory cells;

track a block open time, the block open time comprising an amount of time between the block opening for programming to a time the block closes for programming; and perform a read operation of a programmed page from the block based at least in part on the block open time, wherein performing the read operation comprises adjusting a voltage threshold based at least in part on the block open time.

15. The storage system of claim 14, the storage controller to:

track an amount of time since a last of the plurality of pages was programmed.

16. The storage system of claim 15, the storage controller to:

record the block open time in a header of a last of the plurality of pages that is programmed.

17. A storage system method comprising:

opening a block of flash memory cells for programming, the block comprising a plurality of pages, each page comprising a plurality of flash memory cells;

tracking a block open time, the block open time comprising an amount of time between the block opening for programming to a time the block closes for programming; and performing a read operation of a programmed page from the block based at least in part on the block open time, wherein performing the read operation comprises adjusting a voltage threshold based at least in part on the block open time.

18. The storage system method of claim 17, further comprising:

programming the first page of the block; and tracking a time when the first page is programmed.

19. The storage system method of claim 18, further comprising:

programming a second page of the block after programming the first page; and upon programming the second page, determining a first delta time, the first delta time comprising an amount of time elapsed between programming the first page and programming the second page.

* * * * *